United States Patent [19]

Newcomb et al.

[11] 4,411,528

[45] Oct. 25, 1983

[54] OPTICAL DISPLACEMENT AND CONTOUR MEASURING

[75] Inventors: James S. Newcomb, St. Paul; Charles Eumurian, Mahtomedi, both of Minn.

[73] Assignee: Control Data Corporation, Minneapolis, Minn.

[21] Appl. No.: 226,305

[22] Filed: Jan. 19, 1981

[51] Int. Cl.³ .................. G01B 11/00; G01B 11/14; G02B 5/10

[52] U.S. Cl. .................. 356/375; 350/294; 356/394

[58] Field of Search .................. 356/4, 73, 375, 394, 356/3, 20–21, 381, 376, 4.5; 350/294; 250/201

[56] References Cited

U.S. PATENT DOCUMENTS

| 2,759,106 | 8/1956 | Wolter | 350/294 |
|---|---|---|---|
| 3,187,185 | 6/1965 | Milnes | 356/381 |
| 3,199,400 | 8/1965 | Zabinski | 356/4.5 |
| 3,519,829 | 7/1970 | Pradel et al. | 356/4 |
| 3,770,940 | 11/1973 | Harr | 340/146.3 H |
| 3,889,117 | 6/1975 | Shaw, Jr. | 250/578 |
| 4,102,575 | 7/1978 | Lapornik et al. | 356/125 |
| 4,281,931 | 8/1981 | Chikama | 356/241 |
| 4,305,661 | 12/1981 | Pryor et al. | 356/241 |

FOREIGN PATENT DOCUMENTS

| 631582 | 1/1962 | Italy | 356/3 |
|---|---|---|---|
| 46-37307 | 11/1971 | Japan | 356/3 |
| 55-101003 | 8/1980 | Japan | 356/4 |
| 1002805 | 9/1965 | United Kingdom | 356/4 |
| 2027948 | 2/1980 | United Kingdom | 250/204 |
| 637705 | 12/1978 | U.S.S.R. | 356/241 |

OTHER PUBLICATIONS

Buck, T. M., "A Silicon Diode Array for Image Sensing", Proc. *Conf. on Semiconductor Nuclear-Particle Detectors & Circuits*, Gatlinburg, Tenn., 1968, pp. 306–310.

Khoury, H. A., "Linear Photodiode Feedback Automatic Alignment System", *IBM Tech. Disc. Bull.*, 3-1975, pp. 2887–2889.

Karizomenov et al., "Photoelectric Instrument for Automatic Measurement of Dimensions in Cutting", *Meas. Tech., (USA)*, vol. 15 #1, 1–1972, pp. 47–50.

Shafer, D. R., "Laser Beam Expander–A New Design", *Proc. Soc. Photo-Dpt. Instrum. Eng. (USA)*, SPIE vol. 190, LASL Optics Conf. 1979, pp. 15–20.

*Primary Examiner*—William H. Punter
*Attorney, Agent, or Firm*—Edward P. Heller, III; Joseph A. Genovese

[57] ABSTRACT

Apparatus for optical measurement of the displacement and the obliquity of a test surface relative to an imaginary reference surface. An inwardly converging ring of light is projected onto a test surface. An optical system conveys an image of this ring to a photo diode array where its circumference is compared to an imaginary image of the ring projected onto an imaginary reference surface. This comparison yields the displacement of the test surface through 360° of rotation, which is converted into the shape or contour of the test surface.

3 Claims, 2 Drawing Figures

SHAPE OF PROJECTED RING ON VARIOUS SURFACE

OPTICAL DISPLACEMENT AND CONTOUR MEASURING

BACKGROUND OF THE INVENTION

1. Field of the Invention

The invention relates to apparatus for optically measuring displacement, obliquity and/or contour of a surface.

2. Brief Description of the Prior Art

Optical displacement or range finders using a triangulation technique are well known in the art. See e.g., U.S. Pat. Nos. 3,671,126 to Erb and 3,692,414 to Hosterman et al. Some of these devices have included the capability to gauge the surfaces tilt or contour. See e.g., U.S. Pat. Nos. 3,523,736 to Bottomley, 3,734,626 to Roberts et al., 3,885,875 to Rosenfeld et al., and 3,894,802 to Higgins. At least one patent, Higgins '414, supra, has disclosed a circular sweep in conjunction with triangulation to increase the scan range of the instrument, but not for the purpose of gauging tilt or contour. None have disclosed a projected ring of light for the purpose of simultaneous measurement of displacement and obliquity or contour.

SUMMARY OF THE INVENTION

The invention essentially comprises projecting an inwardly angled circular beam of light on the surface whose range and contour or obliquity are to be measured. The circular beam of light will form a ring of light on the surface the diameter of which varies with the distance of the surface from an imaginary reference surface and the center of which varies with the obliquity of the surface relative to the imaginary reference surface.

In the preferred embodiment, an optical system, aligned on the center of an imaginary ring projected on the imaginary surface, conveys the image of the ring of light on the test surface to a diode array, where the circumference of the image on the array is compared to the circumference of the reference image stored in an electronic memory to compute the displacement of the test surface from the reference surface about the entire circumference. This computation also yields the test surface's contour or obliquity relative to the reference surface.

DESCRIPTION OF THE PREFERRED EMBODIMENT

Figure 1:
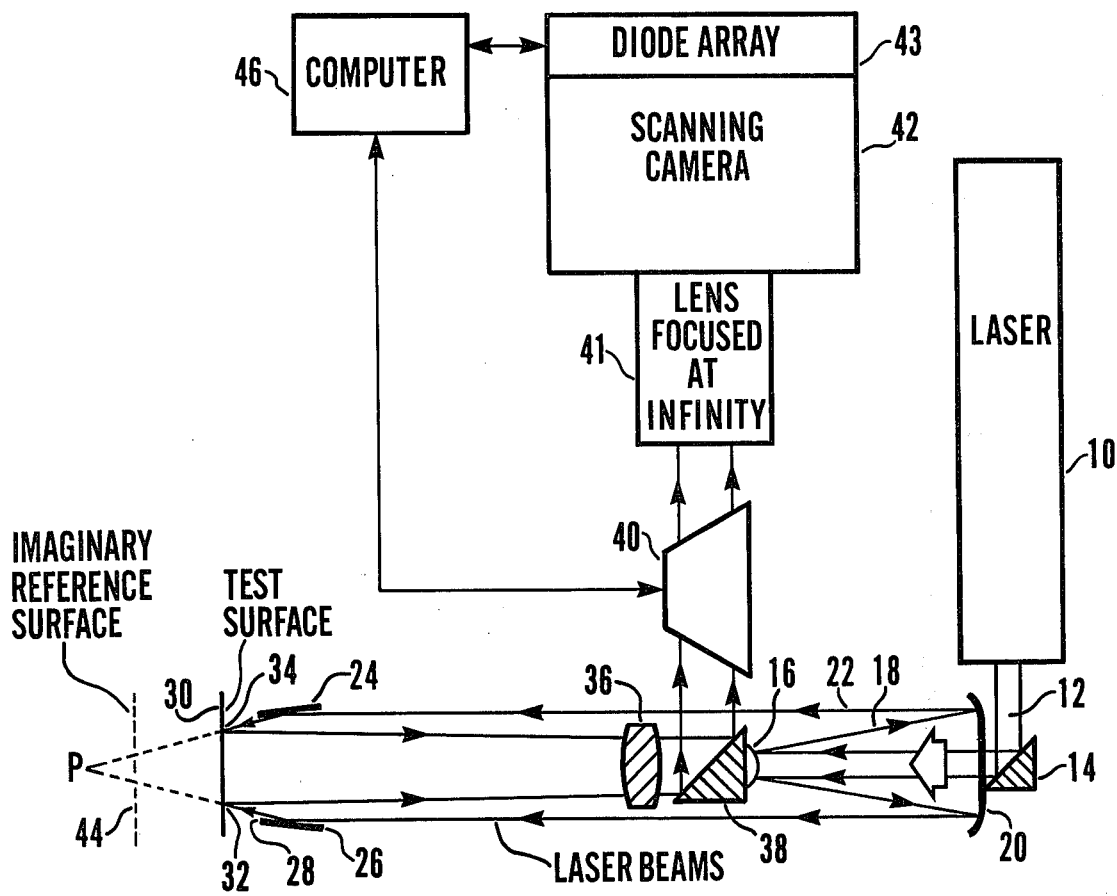
FIG. 1 shows a generalized schematic of the preferred embodiment.

FIG. 1 shows a preferred embodiment of the present invention. Laser 10 projects a collimated beam of light 12 against plain mirror 14, which deflects the beam 90°. (The source of the collimated beam need not be a laser. A laser is chosen because it inexpensively yields an intense source of very bright light.)

The collimated beam 12 thereafter impinges on the center of transverse mounted convex mirror 16, which reflects the beam in a diverging pattern 18. This diverging beam 18 impinges on concave mirror 20 which recollimates the beam. Only the outer edge portions of concave mirror 20 are mirrored. (Alternatively, the central portion of the mirror may be left open as an aperture.) The recollimated beam 22 possesses the form of a circle.

This circular beam 22 then impinges on a conical mirror 24, which is center mounted transverse the recollimated beam 22 with the large diameter opening 26 directed toward concave mirror 20 and the small diameter opening 28 directed toward the test surface 30.

As a result of striking the inner mirrored surface of conical mirror 24, the circular collimated beam 22 is directed inwardly toward point P, such that movement of the test surface laterally toward or away from point P results in proportionally varying the diameter of the ring of light formed by the intersection 34 of the beam 32 with the test surface 30.

The image of the ring of light 34 on the test surface 30 is collimated by relay lens 36, reflected 90° by plane mirror 38, and transmitted through rotatably mounted dove prism 40 to scanning camera 42, which is essentially composed of a lens 41 focused at an infinity and a linear diode array 43 mounted transverse the optical axis of the camera 42 and centered on that axis. Such a linear diode array is a Self-Scanning Photo Diode Array available from EG&G Reticon of Sunnyvale, California.

Connected to the outputs of the photo diode array is a computer 46 or similar electronics, whose operation will shortly be described, but which has stored in its memory the two diode locations which would intercept the image of the beam 32 were it to impinge upon an imaginary reference surface 44.

As is known, the rotation of a dove prism through 180° rotates the transmitted image 360°. Thus, in operation, the dove prism 40 is rotated, either in step fashion or continuously as may be preferred, under control of the computer to sweep all points of the imaged ring through the linear diode array. By coordination of the angular position of the dove prism and comparison of the angular position to the aforementioned two points of intersection of the imaginary reference image on the diode array, the computer may by simple triangulation determine the vertical displacement (relative to the axis of projection of the ring) of discrete points on the circumference of the ring from corresponding points on the circumference of the imaginary reference image. The measurement of these displacements throughout 360° enables the computer to reconstruct the contour of the test surface and its relative displacement from the imaginary reference surface 44.

Figure 2:
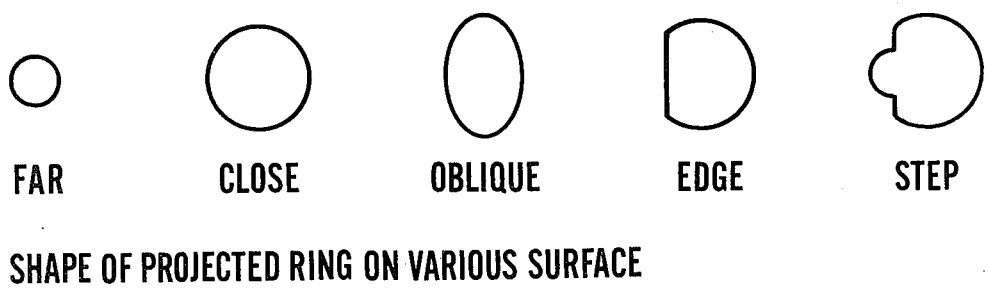
FIG. 2 shows the shape of the projected ring on various surfaces.

FIG. 2 shows the shapes in sizes of several ring images for various exemplary surfaces.

It is to be understood that the dove prism 40 may be omitted in the present invention if and when two-dimensional diode arrays become commercially available or if one chooses to rotate the diode array itself through the image, rather than vice versa.

It is to be further understood that the invention encompasses other optical arrangements for forming an inwardly converging circular beam of light for projection onto a test surface. These may include, without limitation, the scanning of a single spot of light in a circular pattern, such as may be achieved by rotation of a dove prism in the beam projection system.

The specification of the elements of the preferred embodiment should not be taken as a limitation on the scope of the appended claims, in which.

We claim:

1. Apparatus for optically measuring the distance and obliquity of a surface from a reference surface comprising:
   means for providing a collimated beam of light;
   a convex reflecting surface center mounted transverse said collimated beam;
   a concave surface partially mirrored at a predetermined radius adapted to project a collimated ring of light;
   a conical reflection surface center mounted transverse the collimated ring of light and adapted to reflect the collimated ring of light into a converging ring of light;
   a test surface intercepting said converging ring of light;
   optical means for observing and projecting the image of said ring on said test surface;
   means for rotating the image of said ring through 180°;
   linear photo diode means for receiving and detecting the projected and rotated image of said ring; and
   means for converting the detected image of said ring rotated through 180° into the displacement and obliquity of the test surface from an imaginary reference surface through 360°.

2. The apparatus of claim 1 wherein said means for rotating the image of said ring comprises a rotatably mounted dove prism.

3. Apparatus for optically measuring the distance and obliquity of a surface from a reference surface comprising:
   means for providing a collimated beam of light;
   a convex reflecting surface center mounted transverse said collimated beam;
   a concave surface partially mirrored at a predetermined radius adapted to project a collimated ring of light;
   a conical reflecting surface center mounted transverse the collimated ring of light and adapted to reflect the ring of light into a converging ring of light;
   a test surface intercepting said converging ring of light;
   optical means for observing and projecting the image of said ring on said test surface;
   planar photo diode means for receiving and detecting the projected image of said ring; and
   means for converting the detected image of said ring into the displacement and obliquity of the test surface from an imaginary reference surface through 360°.

* * * * *